(12) United States Patent  
Homma

(10) Patent No.: US 8,937,730 B2  
(45) Date of Patent: Jan. 20, 2015

(54) SYSTEM, IMAGE FORMING APPARATUS, SERVER, AND CONTROL METHOD THEREOF

(71) Applicant: Canon Kabushiki Kaisha, Tokyo (JP)

(72) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/896,149

(22) Filed: May 16, 2013

(65) Prior Publication Data

US 2013/0314735 A1 Nov. 28, 2013

(30) Foreign Application Priority Data

May 23, 2012 (JP) .................................. 2012-117753

(51) Int. Cl.
| | |
|---|---|
| *G06F 15/00* | (2006.01) |
| *H04N 1/00* | (2006.01) |
| *H04N 1/44* | (2006.01) |
| *H04L 29/08* | (2006.01) |

(52) U.S. Cl.  
CPC ....... *H04N 1/00228* (2013.01); *H04N 1/00244* (2013.01); *H04N 1/0097* (2013.01); *H04N 1/00973* (2013.01); *H04N 1/4413* (2013.01); *H04L 67/26* (2013.01)  
USPC .......................................................... 358/1.14

(58) Field of Classification Search  
CPC .............................. G06F 21/608; G06F 3/1296  
USPC .......................................................... 358/1.14  
See application file for complete search history.

(56) References Cited

U.S. PATENT DOCUMENTS

2008/0209419 A1* 8/2008 Maeda .......................... 718/100

FOREIGN PATENT DOCUMENTS

JP 2011-146956 A 7/2011

* cited by examiner

*Primary Examiner* — Saeid Ebrahimi Dehkordy  
(74) *Attorney, Agent, or Firm* — Canon USA Inc IP Division

(57) ABSTRACT

A system includes an image forming apparatus and a server connected to the image forming apparatus via the Internet. The image forming apparatus establishes in response to login of a user, a push type communication method for allowing the server to transmit an instruction, and the server transmits, to the image forming apparatus, an instruction relating to setting information corresponding to the logged-in user by using the established push type communication method.

18 Claims, 8 Drawing Sheets

FIG.2

| DEVICE ID (201) | FCOT RANK (202) | FUNCTION (203) |
|---|---|---|
| D001 | HIGH SPEED | COPY, TRANSMISSION |
| D002 | LOW SPEED | COPY |

FIG.3

| USER ID | INITIAL FUNCTION | PRINT FUNCTION SETTING | TRANSMISSION FUNCTION SETTING | PRINT JOB |
|---|---|---|---|---|
| 301 | 302 | 303 | 304 | 305 |
| U001 | TRANSMISSION | COLOR: FULL COLOR | FILE FORMAT: PDF | — |
| U002 | COPY | COLOR: BLACK AND WHITE LAYOUT: 2 in 1 | FILE FORMAT: JPEG | http://www.canon.co.jp/U002/001 |

FIG.6

EXAMPLE OF TRANSMISSION DATA TRANSMITTED TO IMAGE FORMING APPARATUS FROM MANAGEMENT SERVER USING PUSH TYPE COMMUNICATION METHOD

| USER \ IMAGE FORMING APPARATUS | D001 | D002 |
|---|---|---|
| U001 | 1. TRANSMISSION FUNCTION SETTING (FILE FORMAT: PDF)<br>2. SCREEN DISPLAY COMMAND FOR TRANSMISSION FUNCTION<br>3. COPY FUNCTION SETTING (COLOR: FULL COLOR) | 1. COPY FUNCTION SETTING (COLOR: FULL COLOR)<br>2. SCREEN DISPLAY COMMAND FOR COPY FUNCTION |
| U002 | 1. JOB INFORMATION<br>2. COPY FUNCTION SETTING (COLOR: BLACK AND WHITE, LAYOUT: 2 in 1)<br>3. SCREEN DISPLAY COMMAND FOR COPY FUNCTION | 1. JOB INFORMATION<br>2. WARM-UP COMMAND FOR PRINTER UNIT<br>3. COPY FUNCTION SETTING (COLOR: BLACK AND WHITE, LAYOUT: 2 in 1)<br>4. SCREEN DISPLAY COMMAND FOR COPY FUNCTION |

SYSTEM, IMAGE FORMING APPARATUS, SERVER, AND CONTROL METHOD THEREOF

BACKGROUND

1. Field of the Disclosure

Aspects of the present invention relate to a control method for an image forming apparatus using network communication.

2. Description of the Related Art

Conventionally, in order to use a setting customized by a user in any image forming apparatus, there is provided a personalization technique in which user data is managed by an external server (for example, as discussed in Japanese Patent Application Laid-Open No. 2011-146956). In order to save communication time for user authentication with the server which arises before the user data is reflected on the image forming apparatus, Japanese Patent Application Laid-Open No. 2011-146956 discusses a technique in which the image forming apparatus acquires the user data from the server in advance at the timing when a user is not operating the image forming apparatus.

In a case where the user data managed by the server is applied to a number of image forming apparatuses installed in various places, the server may be disposed on the Internet. In such a case, in general, a firewall is disposed between the image forming apparatus and the Internet to take security thereof into consideration. When the above described personalization technique is realized, communication using a polling in which the image forming apparatus within the firewall requests the server on the Internet to transmit user data and acquires the user data is performed. However, when the above method discussed in Japanese Patent Application Laid-Open No. 2011-146956 is realized by the communication using the polling, if the user data is changed on the server, the changed user data cannot be reflected on the image forming apparatus on a real time basis. Therefore, the server needs to wait for a request of user data that is made by the image forming apparatus after the change. In order to increase an update frequency of the user data, a polling interval needs to be shorter. However, in a case where a number of image forming apparatuses are managed, regardless of the presence or absence of a change in user data, there is a problem in that a load for the server to process the request is increased, and a communication load is also applied to the network.

A push type communication method, in which a server on the Internet performs communication by continuously maintaining communication connection with a client on the intra-network within the firewall while making a handshake from the client as a starting point, has been proposed. A protocol known as a WebSocket protocol can be given as an example of the push type communication method. With regard to the WebSocket protocol, the Internet Engineering Task Force (IETF) Request for Comments (RFC) 6455 can be employed as a reference.

Employing the above push type communication method enables the server to transmit user data to the image forming apparatus without causing the image forming apparatus to make a request of the user data. However, in the push type communication method, because the communication connection with the client is maintained by the server, in a case where a number of image forming apparatuses are managed, there arises a problem in which a processing load of the server becomes remarkably high according to the number of image forming apparatuses, or the resource thereof is used considerably.

SUMMARY

Aspects of the present invention are directed to a system of flexibly using a push type communication method for personalization of an image forming apparatus, while a load of a server is taken into consideration by setting suitable information as a transmission target according to the capability of the image forming apparatus and using the push type communication method in a suitable period.

According to an aspect of the present invention, a system includes an image forming apparatus and a server connected to the image forming apparatus via the Internet wherein the image forming apparatus includes a communication control unit configured to, in response to login of a user, perform initial communication with a server to establish a predetermined communication method for allowing the server to transmit an instruction without a request from the image forming apparatus, and a transmission unit configured to transmit, to the server, user identification information for identifying the logged-in user, that is, the user who has logged in, and wherein the server includes a management unit configured to manage setting information that is to be set to the image forming apparatus for each user, a receiving unit configured to receive the user identification information, and an instruction unit configured to transmit, to the image forming apparatus, an instruction relating to setting information corresponding to the user identification information among the managed setting information by using the predetermined communication method established according to the initial communication.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the disclosure.

FIG. 2 is a diagram illustrating an example of a capacity information list of an image forming apparatus managed by a management server.

FIG. 3 is a diagram illustrating an example of a setting information list for each user managed by the management server.

FIG. 6 is a table illustrating an example of setting information applied to the image forming apparatus.

DESCRIPTION OF THE EMBODIMENTS

Various exemplary embodiments, features, and aspects of the invention will be described in detail below with reference to the drawings.

Figure 1:
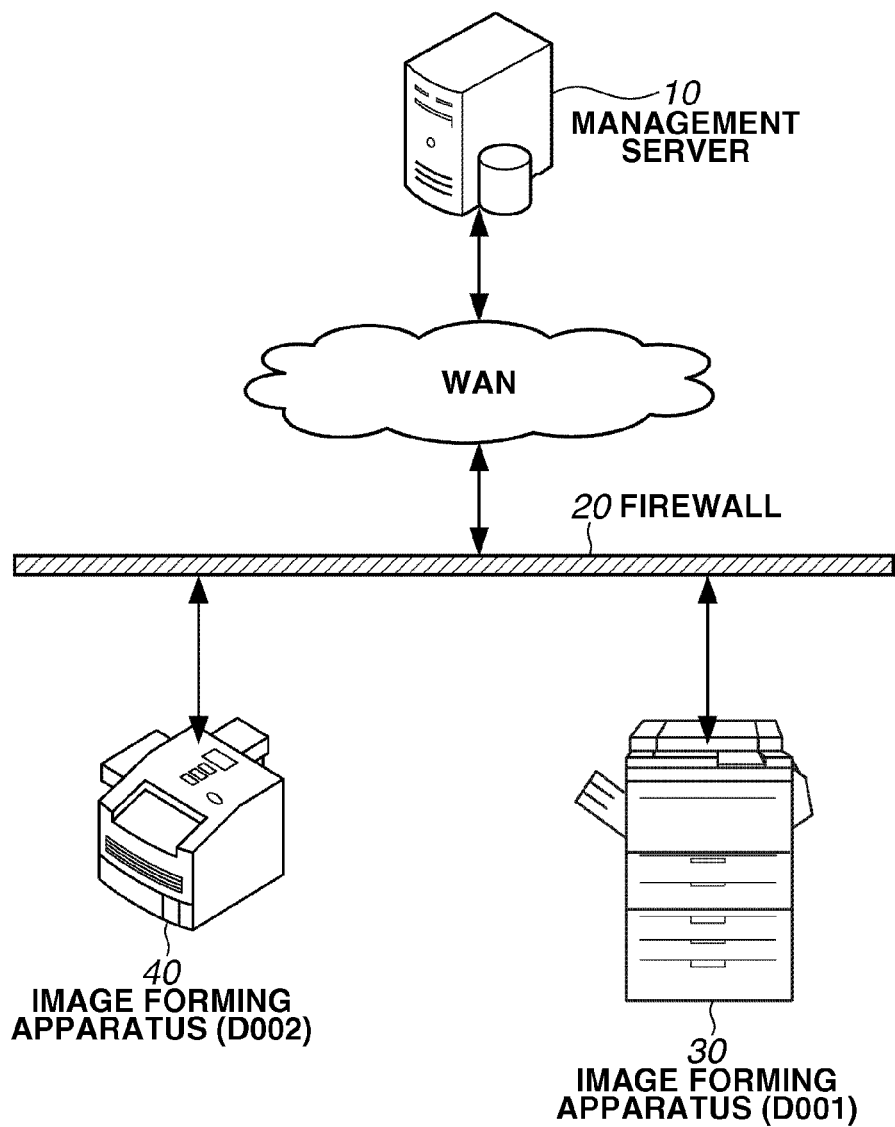
FIG. 1 is a diagram illustrating a system configuration according to an exemplary embodiment of the present invention.

FIG. 1 is a diagram illustrating a system configuration according to an exemplary embodiment of the present invention.

The system according to the present exemplary embodiment includes a management server 10, a firewall 20, an image forming apparatus (D001) 30, and an image forming apparatus (D002) 40. Hereinafter, the image forming apparatus 30 and the image forming apparatus 40 may be simply referred to as "image forming apparatus" when description applicable to both the image forming apparatuses 30 and 40 is given.

The management server 10 has functions of managing the setting information set by a user who uses the image forming apparatus and providing the image forming apparatus with the managed setting information for personalization when the server 10 receives a request of the setting information from the image forming apparatus serving as a request source. Further, by making a handshake from the image forming apparatus as a starting point, the management server 10 has functions of establishing communication by the push type communication method and providing the image forming apparatus with the setting information without any request of the setting information. The management server 10 is connected to a wide area network (WAN) such as the Internet. The firewall 20 has a function of controlling the communication between a local area network (LAN), via which the image forming apparatus (D001) 30 and the image forming apparatus (D002) 40 are connected, and the WAN, and also has a function of enabling access from the LAN to the WAN while preventing an unauthorized access from the WAN.

According to a user input, the image forming apparatus can perform at least any of the processing operations such as printing processing, copy processing, and file transmission processing. Further, the image forming apparatus can execute a user authentication application program to authenticate a user to use the image forming apparatus. The image forming apparatus includes a personalization function in which the image forming apparatus performs customization on screen layout or functional control for the user according to the setting information acquired from the management server 10 by using the information (user ID) for identifying a user who logs into the apparatus.

Figure 7A:
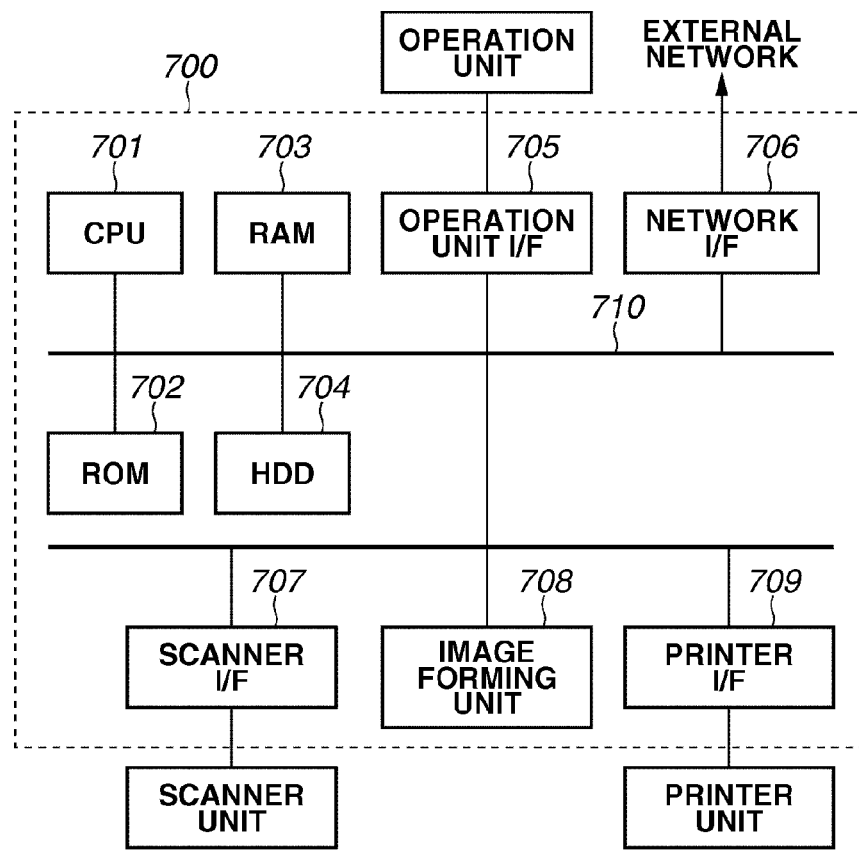
FIGS. 7A and 7B are block diagrams illustrating examples of hardware configurations of the image forming apparatus and an information processing apparatus (management server).
Figure 7B:
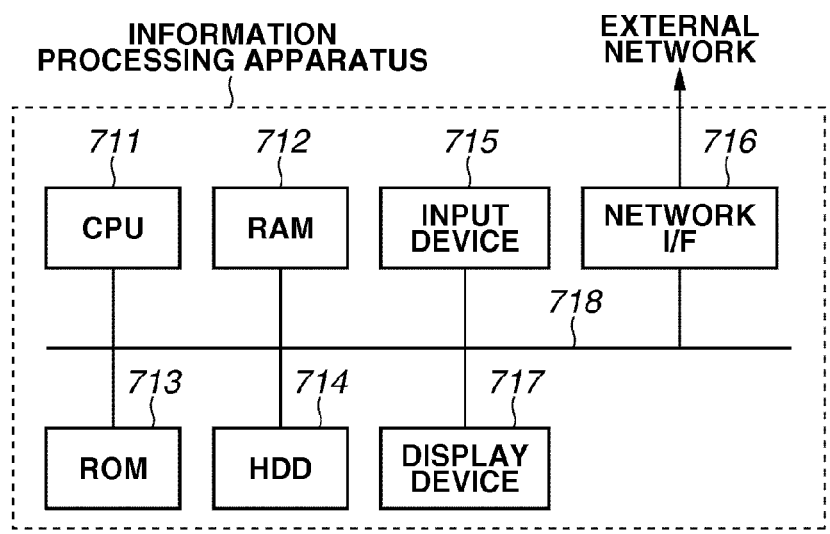

FIGS. 7A and 7B are diagrams illustrating examples of the hardware configurations of the image forming apparatus and the information processing apparatus according to the present exemplary embodiment. In the present invention, the management server 10 serves as the information processing apparatus.

The image forming apparatus includes a scanner unit serving as an image input device, a printer unit serving as an image output device, a controller (controller unit) 700 for controlling operations of the entire image forming apparatus, and an operation unit serving as a user interface (UI). The controller 700 is electrically connected to the scanner unit and the printer unit.

Based on a control program stored in a read only memory (ROM) 702, a central processing unit (CPU) 701 generally controls the access to various devices connected thereto, and generally controls various kinds of processing executed within the controller 700. A boot program for the image forming apparatus is stored in the ROM 702. A random access memory (RAM) 703 serves as a system work memory for the CPU 701 to operate, and also serves as a memory where image data is tentatively stored therein. The RAM 703 includes a static random access memory (SRAM) in which stored content is held even after the power is off, and a dynamic random access memory (DRAM) in which stored content is deleted when the power is off. A hard disk drive (HDD) 704 serves as a hard disk drive in which system software and image data can be stored. A program which realizes the below-described processing serving as characteristic processing of the present invention, relating to the communication with the management server 10 and personalization, is stored in the ROM 702 and the HDD 704, and thus the program can be executed by the CPU 701 (computer). The CPU 701 executes the program by reading the program onto the RAM 703 as necessary, so as to fulfill the functions thereof.

An operation unit interface (I/F) 705 is an interface unit for connecting a system bus 710 to the operation unit. The operation unit I/F 705 receives the image data to be displayed on the operation unit from the system bus 710, outputs the image data to the operation unit, and outputs the information input from the operation unit to the system bus 710. A network I/F 706 connects to an external network to input and output information. A scanner I/F 708 and a printer I/F 709 are interface units, which exchanges information such as the image data respectively with a scanner unit and a printer unit. An electro-photographic method using a photosensitive drum or a photosensitive belt, or an inkjet method can be employed as an image forming method for the printer unit.

An image forming unit 708 performs orientation change, image compression, and image decompression of the image data. Further, the image forming unit 708 includes functions of interpreting the page description language (PDL), and thus the image forming unit 708 receives the PDL data specified by a personal computer (PC) connected to the LAN and converts the PDL data into image data such as bitmap.

In addition to a copy function and a facsimile function, the image forming apparatus may also include functions of reading a document image and transmitting the image data acquired therefrom to the network. The setting information that can be customized individually for each user includes an output setting used when each function of the image forming apparatus is used, an address setting used for transmission, and a storage destination setting used for storing data.

In the information processing apparatus, a CPU 711, a RAM 712, a ROM 713, a hard disk drive (HDD) 714, an input device 715 such as a keyboard or a mouse, and a network I/F 716 are connected to each other via a system bus 718. Further, a display device 717 such as a cathode ray tube (CRT) is also connected to the system bus 718. A program which realizes the below-described processing serving as a characteristic processing of the present invention, relating to the communication with the image forming apparatus and personalization, is stored in the ROM 713 and the HDD 714, and thus the program can be executed by the CPU 711 (computer). The CPU 711 executes the program by reading the program on the RAM 712 as necessary, so as to fulfill the functions thereof.

Figure 8A:
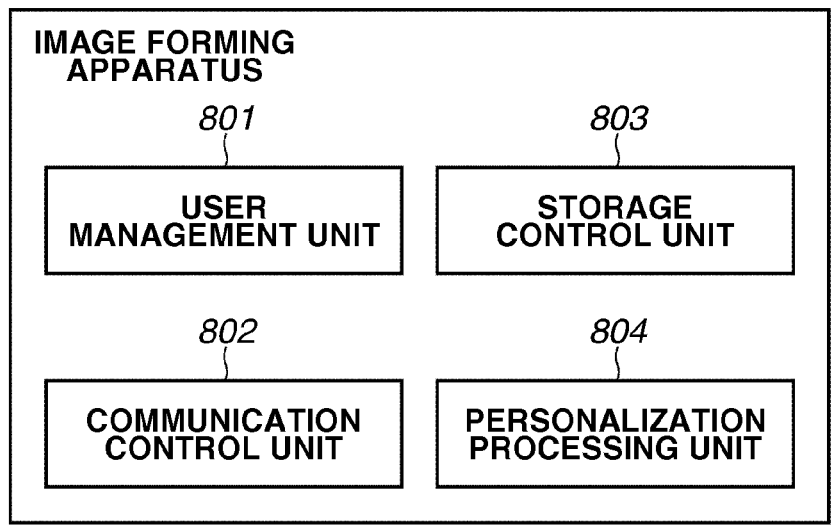
FIGS. 8A and 8B are diagrams illustrating examples of module configurations of the image forming apparatus and the management server.
Figure 8B:
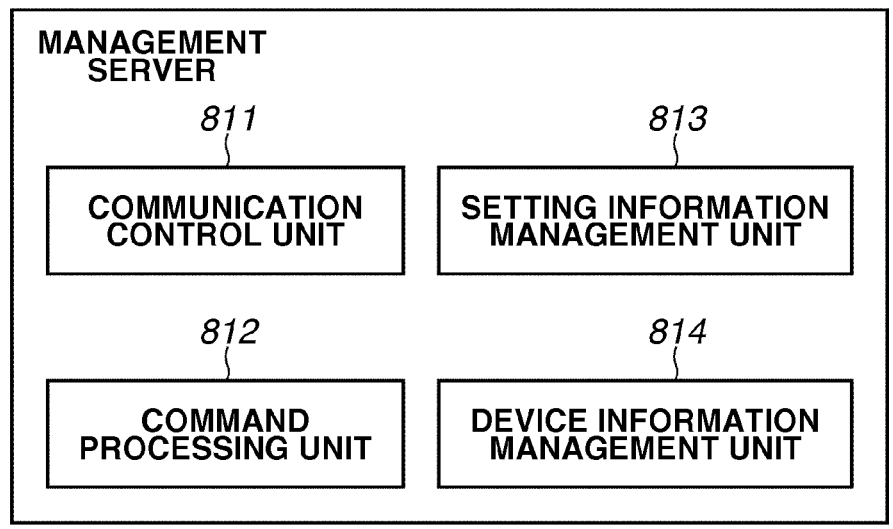

FIGS. 8A and 8B are diagrams illustrating examples of module configurations of the image forming apparatus and the management server 10. Each of the module configurations illustrated in FIGS. 8A and 8B is a software module exemplified to describe an independent operation as a computer when the CPU of each apparatus executes the program for realizing the below-described processing serving as characteristic processing of the present invention. However, the present invention is not limited to the above examples, and the module configuration can be realized by a single module (executable unit of the program), or by providing a plurality of modules corresponding to one or more steps described in the flowchart below as appropriate.

The image forming apparatus includes a user management unit 801, a communication control unit 802, a storage control unit 803, and a personalization processing unit 804.

The user management unit 801 performs processing for determining authority of the user who logs into the image forming apparatus. The communication control unit 802 performs control processing for starting the connection with the management server 10 by the WebSocket protocol, and control processing for receiving a command from the management server 10. The storage control unit 803 controls the data received from the management server 10 to be tentatively stored in a predetermined region such as the HDD 704. According to the command received from the management server 10, the personalization processing unit 804 executes personalization processing for reflecting the setting information for each user.

The management server 10 includes a communication control unit 811, a command processing unit 812, a setting information management unit 813, and a device information management unit 814. The communication control unit 811 performs control processing for starting the connection with the image forming apparatus by the WebSocket protocol, and control processing for transmitting a command from the management server 10. The command processing unit 812 issues a command relating to personalization to the image forming apparatus. The setting information management unit 813 manages setting information used for the personalization of each user. The device information management unit 814 manages capacity information of the image forming apparatus that exists on the network.

FIG. 2 is a diagram illustrating an example of a list of capacity information of the image forming apparatus managed by the management server 10.

A device ID 201 is identification information for identifying the image forming apparatus. A first copy out time (FCOT) rank 202 is information indicating a rank of FCOT speed of the image forming apparatus, and the rank thereof is indicated as "High speed" or "Low speed". A function 203 is information indicating the functions included in the image forming apparatus. "Transmission" represents a transmission function for transmitting image data and a file to a set address.

FIG. 3 is a diagram illustrating an example of a list of the setting information for each user managed by the management server 10 which is to be applied when the user uses the image forming apparatus. Personalization of the image forming apparatus is executed according to the setting information.

A user ID 301 is identification information for identifying a user.

An initial function 302 is information indicating a function to be initially displayed when a user logs into the image forming apparatus. A print function setting 303 is information indicating a print setting to be used by default when a user uses a copy function and a print function of the image forming apparatus. A transmission function setting 304 is information indicating a setting to be used by default when a user uses a transmission function of the image forming apparatus. A print job 305 indicates reference information (in FIG. 3, Uniform Resource Identifier (URI) format) for referring to a job to be printed by using the image forming apparatus. When a user registers print data to a desired server as a job, the reference information is registered in order to indicate that the job exists on a printing queue. The above job is registered in the management server 10 itself or other external apparatuses on the network, and stored therein while the job is associated with the user information. The image forming apparatus can execute printing by using the reference information to acquire the job from the desired server.

Figure 4:
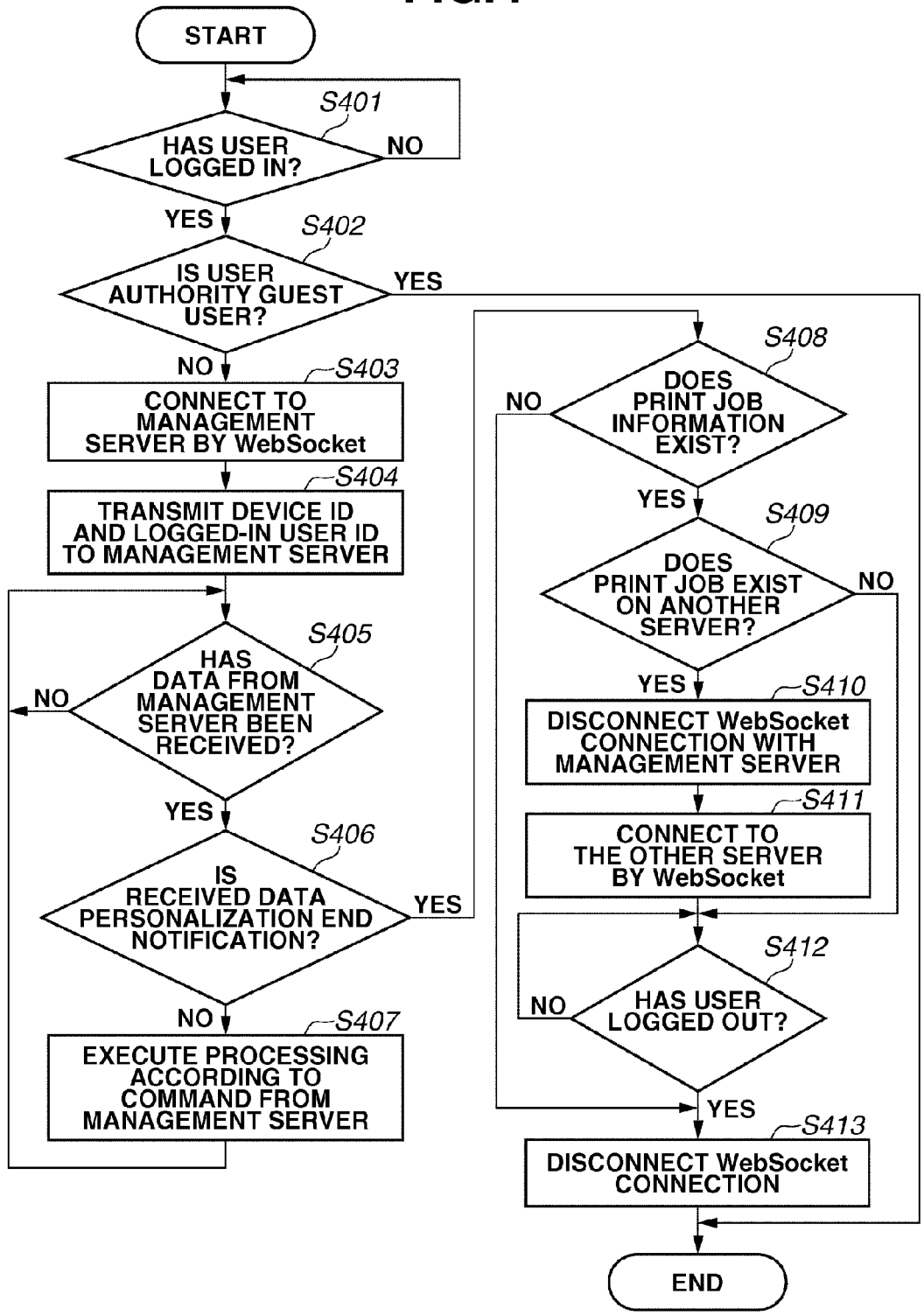
FIG. 4 is a flowchart illustrating personalization processing in the image forming apparatus.
Figure 5:
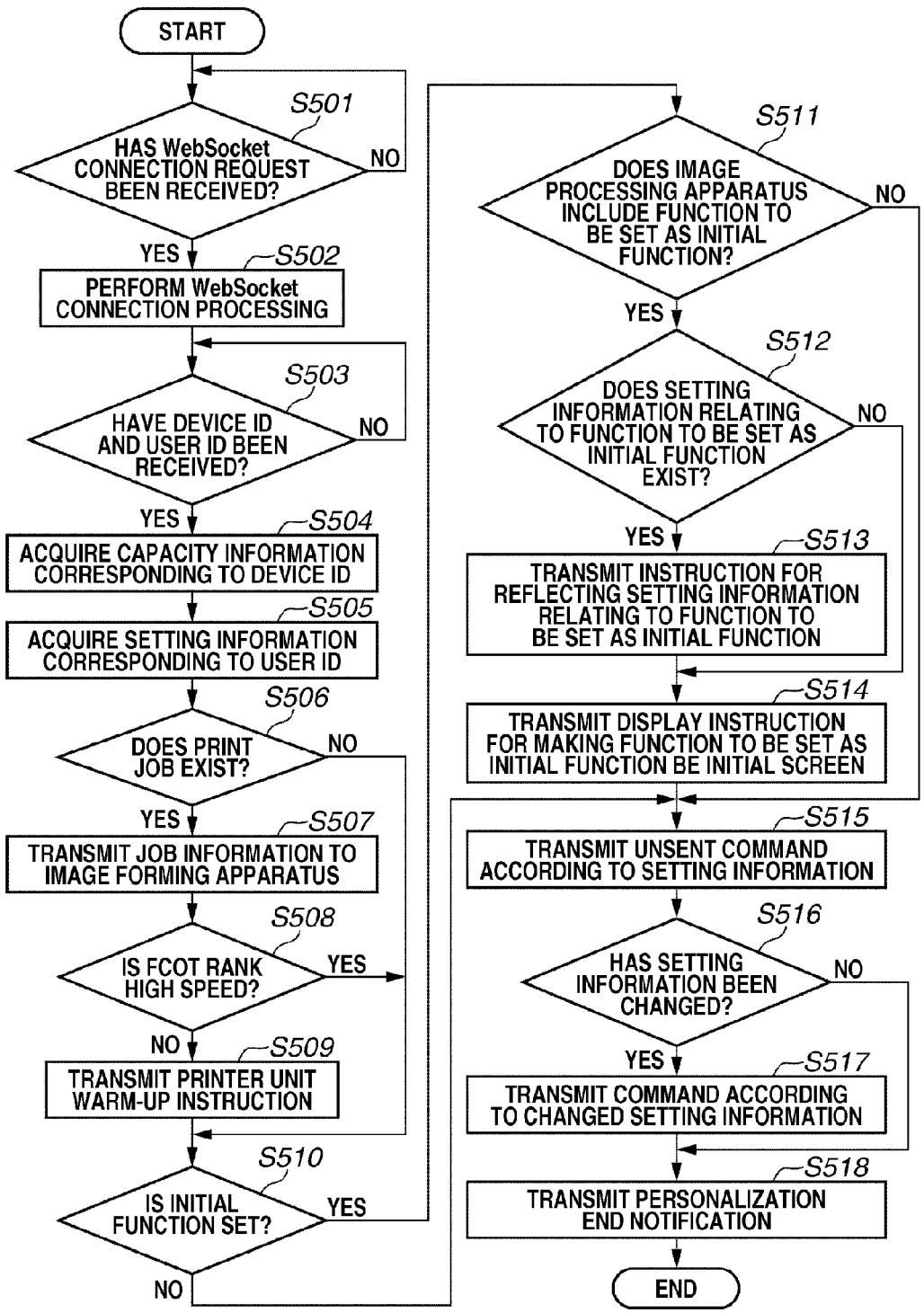
FIG. 5 is a flowchart illustrating personalization processing in the management server.

With reference to FIGS. 4 through 6, personalization processing of the image forming apparatus according to the present exemplary embodiment will be described in detail.

FIG. 4 is a flowchart illustrating the personalization processing in the image forming apparatus. As described above, the processing is realized when the CPU 701 executes the program stored in a predetermined storage region of the image forming apparatus to cause each module illustrated in FIG. 8A to operate independently.

In step S401, based on the information from the user authentication application program, the user management unit 801 waits for the user to log in, and when the user management unit 801 determines that the user has logged in (YES in step S401), the processing proceeds to step S402. In step S402, based on the information of the logged-in user (user ID), the user management unit 801 determines whether the authority of the logged-in user indicates a guest user. In a case where the user authority indicates the guest user (YES in step S402), the processing is terminated without performing the personalization processing. In a case where the user authority does not indicate the guest user (NO in step S402), the processing proceeds to step S403.

In step S403, the communication control unit 802 controls the image forming apparatus to connect to the management server 10 through a communication method which enables the management server 10 to perform push type communication. Specifically, the communication control unit 802 transmits, to the management server 10, an initial communication command for connecting by the WebSocket protocol. By making this command as a starting point, a handshake is performed between the image forming apparatus and the management server 10, so that the communication using the WebSocket protocol is established.

In step S404, the communication control unit 802 transmits, to the management server 10, the device ID of the image forming apparatus and a user ID of the logged-in user. Alternatively, as a device ID, the communication control unit 802 may transmit, to the management server 10, capacity information of the image forming apparatus that is required for the personalization processing. The information transmitted in step S404 may be transmitted to the management server 10 by using a different protocol at the timing before the connection is established by the WebSocket protocol.

In step S405, the communication control unit 802 waits for data to be transmitted from the management server 10, and when the data is transmitted from the management server 10 (YES in step S405), the processing proceeds to step S406. The storage control unit 803 tentatively stores the data received in step S405 in a predetermined region such as the HDD 704. In step S406, the personalization processing unit 804 determines whether the data received in step S405 is a personalization end notification. If the data received in step S405 is a personalization end notification (YES in step S406), the processing proceeds to step S408. If the data received in step S405 is not a personalization end notification (NO in step S406), the processing proceeds to step S407. In step S407, according to a command included in the data received in step S405, the personalization processing unit 804 performs personalization processing of the image forming apparatus. Thereafter, the processing proceeds to step S405. The personalization processing executed in step S407 includes warm-up processing of a printer unit, a transmission function setting for each user, and application processing of copy function setting, each of which will be described below with reference to FIG. 6.

Through the processing in steps S405 through S407, even though the image forming apparatus does not make any request in particular, a command for the personalization processing is transmitted from the management server 10, so that the personalization processing is performed in the image forming apparatus. Because the image forming apparatus does not make any request, the data volume transmitted and received through the network can be reduced. Further, in a case where the setting information is changed in the management server 10 while the image forming apparatus and the management server 10 are connected by the push type communication method, the changed setting information is transmitted by making the management server 10 as a starting point. Accordingly, the personalization processing can be optimized.

In step S408, the personalization processing unit 804 determines whether print job information is included in the data received in step S405. If the print job information is included therein (YES in step S408), the processing proceeds to step S409. If the print job information is not included therein (NO in step S408), the processing proceeds to step S412.

In step S409, the personalization processing unit 804 analyzes the print job information and determines whether the print job exists on a server other than the management server 10. For example, the personalization processing unit 804 determines whether the print job exists on the management server 10 by checking the URI which indicates a reference destination of the print job included in the print job information. In a case where the personalization processing unit 804 determines that the print job exists on another server (YES in step S409), the processing proceeds to step S410. In a case where the personalization processing unit 804 determines that the print job does not exist on the other server (NO in step S409), the processing proceeds to step S412.

In step S410, the communication control unit 802 disconnects the WebSocket connection with the management server 10. This processing is realized when the communication control unit 802 transmits, to the management server 10, a predetermined command for executing disconnection processing. In step S411, in order to acquire the print job, the communication control unit 802 connects the image forming apparatus to the above-described other server by the WebSocket protocol. This processing is performed by the same connection method as described in step S403.

In step S412, based on the information from the user authentication application program, the user management unit 801 waits for the user to log out. When the user management unit 801 detects that the user has logged out (YES in step S412), the processing proceeds to step S413. Processing according to the user operation will be executed while the user management unit 801 waits for the user to log out. However, the description thereof will be omitted as this processing does not relate directly to the processing of the system according to the present invention. In a case where the image forming apparatus further receives a command from the management server 10 before the user logs out, the personalization processing unit 804 executes the personalization processing according to the received command. In step S413, the communication control unit 802 disconnects the WebSocket connection with the management server 10 or the above-described other server. Thereafter, the processing is terminated.

FIG. 5 is a flowchart illustrating the personalization processing in the management server 10. As described above, the processing is realized when the CPU 711 executes the program stored in a predetermined storage region of the management server 10 to cause each module illustrated in FIG. 8B to operate independently.

In step S501, the communication control unit 811 waits until the communication control unit 811 detects the receipt of a WebSocket connection request from the image forming apparatus via the network I/F 716. In a case where the communication control unit 811 receives the WebSocket connection request (YES in step S501), the processing proceeds to step S502. In step S502, the communication control unit 811 performs initial communication processing based on the WebSocket regulations, and establishes the WebSocket connection with the image forming apparatus. The above processing is communication control processing of the management server 10 corresponding to the processing described in step S403 in FIG. 4.

In step S503, the communication control unit 811 waits until the device ID and the user ID are received from the image forming apparatus. In a case where the communication control unit 811 detects the receipt of the IDs therefrom (YES in step S503), the processing proceeds to step S504.

In step S504, the device information management unit 814 uses the device ID received in step S503, searches for the list of capacity information of the image forming apparatus illustrated in FIG. 2 and acquires the capacity information of the image forming apparatus connected thereto.

In step S505, the setting information management unit 813 uses the user ID received in step S503, searches for the list of setting information for each user illustrated in FIG. 3, and acquires the setting information provided for the user who logs into the image forming apparatus connected thereto.

In step S506, the setting information management unit 813 refers to the print job column 305 of the setting information acquired in step S505, and determines whether any printing job exists on a printing queue. If the printing job exists (YES in step S506), the processing proceeds to step S507. If the printing job does not exist (NO in step S506), the processing proceeds to step S510. In step S507, the communication control unit 811 transmits, to the image forming apparatus, reference information included in the print job column 305 as job information. In a case where the management server 10 stores the target print job, the communication control unit 811 may directly transmit, to the image forming apparatus, that print job as the job information. The image forming apparatus that has received the print job stores the print job in the RAM 703 based on the job information. In step S508, the device information management unit 814 refers to the capacity information of the image forming apparatus acquired in step S504, and determines whether the FCOT rank of the image forming apparatus connected thereto is "High speed". In a case where the FCOT rank is "High speed" (YES in step S508), the processing proceeds to step S510. In a case where the FCOT rank is not "High speed" (NO in step S508), the processing proceeds to step S509. In step S509, the command processing unit 812 issues a warm-up instruction (command) of the printer unit, and the communication control unit 811 transmits, to the image forming apparatus, the warm-up command thereof. By distributing the above command in advance by push distribution, even in the image forming apparatus in which first printing requires time, the printing processing can be promptly executed according to the print instruction from the user of the image forming apparatus after the personalization processing.

In step S510, the setting information management unit 813 refers to the initial function 302 of the setting information acquired in step S505, and checks the setting thereof. If the initial function is set thereto (YES in step S510), the processing proceeds to step S511. If the initial function is not set thereto (NO in step S510), the processing proceeds to step S515. In step S511, the device information management unit 814 refers to the capacity information of the image forming apparatus acquired in step S504, and determines whether the image forming apparatus includes a function set as the initial function. In a case where the device information management unit 814 determines that the image forming apparatus includes the function (YES in step S511), the processing proceeds to step S512. In a case where the device information management unit 814 determines that the image forming apparatus does not include the function (NO in step S511), the processing proceeds to step S515.

In step S512, the setting information management unit 813 refers to the setting information acquired in step S505, and determines whether the setting information for personalization relating to the function set as the initial function exists. If the setting information exists (YES in step S512), the processing proceeds to step S513. If the setting information does not exist (NO in step S512), the processing proceeds to step S514.

In step S513, in order to reflect the setting information for the personalization relating to the function set as the initial function, the communication control unit 811 transmits, to the image forming apparatus, an instruction including that setting information. In step S514, the command processing unit 812 issues a display instruction (command) to cause the function set as the initial function to be an initial screen, and the communication control unit 811 transmits the display command to the image forming apparatus.

In step S515, the setting information management unit 813 refers to the setting information acquired in step S505. If there is any unsent setting information, the setting information management unit 813 causes the communication control unit 811 to transmit, to the image forming apparatus, an instruction including that unsent information. Based on the capacity information of the image forming apparatus acquired in step S504, among the unsent information, the setting information relating to the function not included in the image forming apparatus will not be transmitted.

In step S516, the setting information management unit 813 checks whether there is any change in the setting information acquired in step S505. It is assumed that the change in setting information is made via the input device 715 or the network I/F 716 of the management server 10. If there is any change in the setting information (YES in step S516), the processing proceeds to step S517. If there is no specific change in the setting information (NO in step S516), the processing proceeds to step S518. In step S517, in order to reflect the changed setting information, the communication control unit 811 transmits, to the image forming apparatus, an instruction including that setting information.

In step S518, the command processing unit 812 issues a personalization end notification command, and the communication control unit 811 transmits the personalization end notification to the image forming apparatus. Thereafter, the processing in the management server 10 is terminated. Alternatively, without issuing the end notification command, the management server 10 may terminate the personalization processing by disconnecting the WebSocket connection.

FIG. 6 is a table illustrating an example of transmission data transmitted to the image forming apparatus from the management server 10 by using the push type communication method when a user logs in. In the table illustrated in FIG. 6, difference in transmission data depending on the combination of the user and the image forming apparatus is clearly described. As illustrated in FIG. 6, depending on the combination thereof, different setting information is supplied to the image forming apparatus for personalization. Each of the numerals in the table indicates a transmission order of each instruction (command) corresponding to the setting information according to the processing illustrated in FIG. 5.

Specifically, when a user (U001) uses the image forming apparatus (D001), at first, the management server 10 transmits, to the image forming apparatus (D001), the setting information of the "Transmission" function as the initial setting because a print job is not registered therein. Then, the management server 10 transmits a display instruction for causing the initial setting of the "Transmission" function to be displayed as an initial screen. Finally, the management server 10 transmits, to the image forming apparatus (D001), the setting information of the "Copy" function as the rest of setting information.

Further, in a case where a user (U002) uses the image forming apparatus (D002), at first, the management server 10 transmits job information to the image forming apparatus (D002). Next, the management server 10 transmits a warm-up command of the printer unit because the FCOT rank of the image forming apparatus (D002) is not "High speed". Then, the management server 10 transmits, to the image forming apparatus (D002), the setting information of the "Copy" function as the initial setting. Thereafter, the management server 10 transmits a display instruction for causing the initial setting of the "Copy" function to be displayed as the initial screen. The setting information relating to the transmission function is not transmitted to the image forming apparatus (D002) because the image forming apparatus (D002) does not include the transmission function.

The present invention can be realized by executing the following processing. That is, software (program) for realizing the functions described in the above exemplary embodiment is supplied to a system or an apparatus via a network or various storage media, and the system or a computer (or a CPU or a micro processing unit (MPU)) of the apparatus reads and executes the program. Furthermore, by using the above program, the above described processing can be realized by causing the management server 10 to operate in coordination with a plurality of server apparatuses.

According to the exemplary embodiment of the present invention, a method of flexibly using the push type communication method for the personalization of the image forming apparatus can be provided while a load of the server is taken into consideration.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-117753 filed May 23, 2012, which is hereby incorporated by reference herein in its entirety.

What is claimed is:

1. A system comprising an image forming apparatus and a server connected to the image forming apparatus via the Internet, wherein the image forming apparatus includes:
   a communication control unit configured to, in response to login of a user, perform initial communication with the server to establish a predetermined communication method for allowing the server to transmit an instruction without a request from the image forming apparatus; and
   a transmission unit configured to transmit, to the server, user identification information for identifying the user who has logged in;
wherein the server includes:
   a management unit configured to manage data that is to be transmitted to the image forming apparatus for personalization processing;
   a receiving unit configured to receive the user identification information;
   a determination unit configured to determine data to be transmitted based on device information of the image forming apparatus and the received user identification information, and to determine a transmission order of the data; and
   an instruction unit configured to transmit, to the image forming apparatus, an instruction relating to determined data according to the determined transmission order by using the predetermined communication method established according to the initial communication, wherein the data includes at least setting information required for the personalization processing for each user and a command for changing a state of the image forming apparatus.

2. An image forming apparatus connectable to a server via the Internet, the image forming apparatus comprising:
   a communication control unit configured to, in response to login of a user, perform initial communication with the server to establish a predetermined communication method for allowing the server to transmit an instruction without a request from the image forming apparatus;
   a transmission unit configured to transmit, to the server, user identification information for identifying the user who has logged in; and
   a processing unit configured to perform personalization processing according to the instruction from the server received by using the predetermined communication method,
   wherein the instruction from the server relates to setting information required for personalization processing for each user according to information of the image forming apparatus and the user identification information and a command for changing a state of the image forming apparatus.

3. The image forming apparatus according to claim 2, wherein the predetermined communication method includes a WebSocket protocol.

4. The image forming apparatus according to claim 2, wherein the communication control unit disconnects the predetermined communication method after the user logs out.

5. The image forming apparatus according to claim 2, wherein the communication control unit disconnects the predetermined communication method according to an end notification from the server received by using the predetermined communication method.

6. A server connectable to an image forming apparatus via the Internet, the server comprising:
   a management unit configured to manage data is to be transmitted to the image forming apparatus for personalization processing;
   a receiving unit configured to receive user identification information for identifying a user who logs into the image forming apparatus;
   a determination unit configured to determine data to be transmitted based on device information of the image forming apparatus and the received user identification information, and to determine a transmission order of the data; and
   an instruction unit configured to transmit, to the image forming apparatus, an instruction relating to the determined data according to the determined data according to the determined transmission order after initial communication executed by the image forming apparatus to establish a predetermined communication method for allowing the server to transmit an instruction without a request from the image forming apparatus, by using the established predetermined communication method,
   wherein the data includes setting information required for at least personalization processing for each user and a command for changing a state of the image forming apparatus.

7. The server according to claim 6, wherein the predetermined communication method includes a WebSocket protocol.

8. The server according to claim 6, wherein the initial communication is executed in response to login of a user with respect to the image forming apparatus.

9. The server according to claim 6, wherein the instruction unit transmits, to the image forming apparatus, an warm-up instruction of a printer unit of the image forming apparatus as the command for changing the state of the image forming apparatus prior to an instruction relating to the setting information by using the predetermined communication method.

10. The server according to claim 6, wherein, in a case where there is a change in the managed data by the management unit, the instruction unit transmits, to the image forming apparatus, an instruction relating to the changed data by using the predetermined communication method without a request from the image forming apparatus.

11. The server according to claim 6, wherein, in a case where data to be transmitted does not exist, the instruction unit transmits, to the image forming apparatus, an end notification for disconnecting the predetermined communication method.

12. A method for a system including an image forming apparatus and a server connected to the image forming apparatus via the Internet, the method comprising:
   performing, in response to login of a user to the image forming apparatus, initial communication from the image forming apparatus to the server to establish a predetermined communication method for allowing the server to transmit an instruction without a request from the image forming apparatus;

transmitting, to the server from the image forming apparatus, user identification information for identifying the user who has logged in;

determining data to be transmitted from the server to the image forming apparatus based on the transmitted user identified information and a transmission order of the data; and transmitting, to the image forming apparatus from the server, data to be transmitted to the image forming apparatus by using the predetermined communication method established according to the initial communication, wherein the data to be transmitted at least setting information required for the personalization processing for each user and a command for changing a state of the image forming apparatus.

13. A control method for an image forming apparatus connected to a server via the Internet, the control method comprising:

performing, in response to login of a user, initial communication with the server to establish a predetermined communication method for allowing the server to transmit an instruction without a request from the image forming apparatus;

transmitting, to the server, user identification information for identifying the user who has logged in; and performing personalization processing according to an instruction from the server received by using the predetermined communication method, wherein the instruction transmitted from the server relates to setting information required for personalization processing for each user according to information of the image forming apparatus and the user identification information and a command for changing a state of the image forming apparatus.

14. The control method according to claim 13, wherein the predetermined communication method includes a WebSocket protocol.

15. A control method for a server connected to an image forming apparatus via the Internet, the control method comprising:

managing data to be transmitted to the image forming apparatus for personalization processing;

receiving user identification information for identifying a user who logs into the image forming apparatus;

determining the data to be transmitted based on device information of the image forming apparatus and the received user identification information and determining a transmission order of the data to be transmitted;

transmitting, to the image forming apparatus, an instruction relating to the determined data to be transmitted according to the determined transmission order after initial communication executed by the image forming apparatus to establish a predetermined communication method for allowing the server to transmit an instruction without a request from the image forming apparatus, by using the established predetermined communication method, wherein the data includes setting information required for at least personalization processing for each user and a command for changing a state of the image forming apparatus.

16. The control method according to claim 15, wherein the predetermined communication method includes a WebSocket protocol.

17. A non-transitory computer-readable storage medium storing a computer program that causes a computer to execute a method for an image forming apparatus connected to a server via the Internet, the method comprising:

performing, in response to login of a user, initial communication with the server to establish a predetermined communication method for allowing the server to transmit an instruction without a request from the image forming apparatus;

transmitting, to the server user, identification information for identifying the user who has logged in; and performing personalization processing according to an instruction from the server received by using the predetermined communication method, wherein the instruction transmitted from the server relates to setting information required for personalization processing for each user according to information of the image forming apparatus and the user identification information and a command for changing a state of the image forming apparatus.

18. A non-transitory computer-readable storage medium storing a computer program that causes a computer to execute a method for a server connected to an image forming apparatus via the Internet, the method comprising:

managing data to be transmitted to the image forming apparatus for personalization processing;

receiving user identification information for identifying a user who logs into the image forming apparatus;

determining data to be transmitted based on device information of the image forming apparatus and the received user identification information, and determining a transmission order of the data; and transmitting, to the image forming apparatus, an instruction relating to the determined data according to the transmission order after initial communication executed by the image forming apparatus to establish a predetermined communication method for allowing the server to transmit an instruction without a request from the image forming apparatus, by using the established predetermined communication method, wherein the data includes setting information required for at least personalization processing for each user and a command for changing a state of the image forming apparatus.

* * * * *